US011798331B2

United States Patent
Tan et al.

(10) Patent No.: US 11,798,331 B2
(45) Date of Patent: Oct. 24, 2023

(54) METHOD AND APPARATUS FOR INCREASING SECURITY AT AN ACCESS POINT

(71) Applicant: MOTOROLA SOLUTIONS, INC., Chicago, IL (US)

(72) Inventors: Woei Chyuan Tan, Bayan Lepas (MY); Zehong Au, Georgetown (MY); Kok Soon Hong, Georgetown (MY); Anoop Sehgal Paras Ram, Ipoh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/653,927

(22) Filed: Mar. 8, 2022

(65) Prior Publication Data

US 2023/0290200 A1    Sep. 14, 2023

(51) Int. Cl.
    *G07C 9/00*       (2020.01)
    *G06V 20/52*      (2022.01)
    *H04N 7/18*       (2006.01)
    *G16Y 40/35*      (2020.01)

(52) U.S. Cl.
    CPC ......... *G07C 9/00309* (2013.01); *G06V 20/52* (2022.01); *G07C 2009/00404* (2013.01); *G16Y 40/35* (2020.01); *H04N 7/181* (2013.01)

(58) Field of Classification Search
    CPC ...... G07C 9/00309; G07C 2009/00404; G06V 20/52; G16Y 40/35; H04N 7/181
    See application file for complete search history.

(56) References Cited

U.S. PATENT DOCUMENTS

| 8,890,652 | B2 | 11/2014 | Falk et al. |
| 9,533,653 | B2 | 1/2017 | Daman et al. |
| 9,711,023 | B2 | 7/2017 | Lyman et al. |
| 2002/0030584 | A1* | 3/2002 | Perler ............... G06F 18/00 340/5.53 |
| 2015/0117619 | A1 | 4/2015 | Carpenter et al. |
| 2016/0350988 | A1 | 12/2016 | Malhotra |
| 2017/0069196 | A1 | 3/2017 | Jacobs |
| 2018/0247070 | A1* | 8/2018 | Evans ............... G08B 25/12 |
| 2020/0168068 | A1 | 5/2020 | Lyman et al. |
| 2021/0271894 | A1 | 9/2021 | Polinski et al. |

FOREIGN PATENT DOCUMENTS

EP    3671662 A1    6/2020

OTHER PUBLICATIONS

The International Search Report and the Written Opinion, corresponding patent application No. PCT/US2023/012906 filed: Feb. 13, 2023 dated May 4, 2023, all pages.

* cited by examiner

*Primary Examiner* — Vernal U Brown
(74) *Attorney, Agent, or Firm* — Daniel R Bestor (57) ABSTRACT

A method and apparatus for increasing security at access points for a room or facility is provided herein. During operation, a security level at an access point will be increased during a lockdown situation. The increased security at the access point will require permission from those behind the access point prior to granting entry to any individual.

9 Claims, 6 Drawing Sheets

METHOD AND APPARATUS FOR INCREASING SECURITY AT AN ACCESS POINT

BACKGROUND OF THE INVENTION

During many active shooter situations at workplaces, the active shooter is also an employee of the workplace. Because of this, a locked door may not be enough to protect those who are hiding from the active shooter since the active shooter may be able to enter through access-controlled doors using their own credentials. This makes it more difficult for individuals to protect themselves during an active shooter situation.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for increasing security at access points for a room or facility is provided herein. During operation, a security level at an access point will be increased during a lockdown situation. The increased security at the access point will require permission from those behind the access point prior to granting entry to any individual.

As an example of the above, consider an access point to a room that requires a badge (ID) to be recognized before granting access to the room. Thus, prior to a lock-down situation occurring, anyone with an appropriate ID will be able to scan their ID to enter the room. However, once a lockdown occurs, the scanning of the appropriate ID will trigger an access request to be sent to those individuals within the room. The identity (such as a name, or occupation) of the individual attempting to gain access may also be provided to those within the room. Those within the room will control who can and cannot enter. If the person is unrecognized, or known to be a danger, then access to the room will not be given by those inside the room.

It should be noted that if no one is in the room during the lockdown situation, then the door will be opened with an appropriate ID without having to get a secondary authorization from anyone. It should also be noted that the term "lockdown" is intended to mean an emergency measure or condition in which people are temporarily prevented from entering or leaving a restricted area or building (such as a school) during a threat of danger, or a state of isolation or restricted access instituted as a security measure. The term "lockdown" is also meant to include any situation in which ingress for individuals is restricted.

Figure 1:
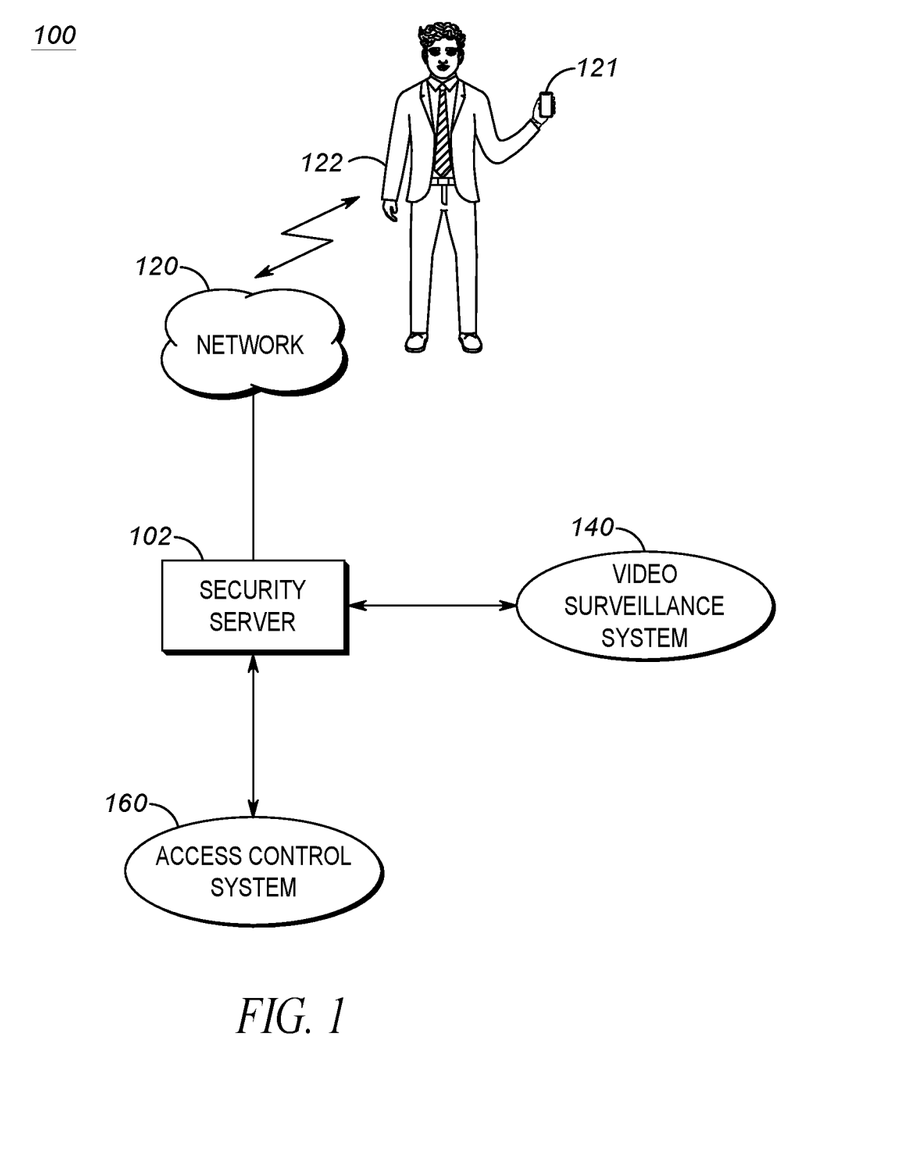
FIG. 1 illustrates a security ecosystem.

Turning now to the drawings, wherein like numerals designate like components, FIG. 1 illustrates security ecosystem 100 capable of increasing a security level for an access point during a lockdown. As shown, security ecosystem 100 comprises radio network 120, video surveillance system 140, and access control system 160. Security server 102 is coupled to each system 120, 140, and 160, with smart devices 121 coupled to network 120. It should be noted that although the components in FIG. 1 are shown geographically separated, these components can exist within a same geographic area, such as, but not limited to a room, school, a hospital, an airport, a sporting event, a stadium, ..., etc. It should also be noted that although only networks and systems 120-160 are shown in FIG. 1, one of the ordinary skill in the art will recognize that many more networks and systems may be included in ecosystem 100.

Security server 102 is preferably a server running Motorola Solution's Command Central™ software suite comprising the Orchestrate™ platform. Security server 102 is configured to execute workflows stored in memory. Workflows comprise a trigger (i.e., a detected event such as a lockdown occurring) and an action (such as increasing security for access points). The action is executed whenever the event is detected. Security server 102 is configured to receive a particular trigger of when a lockdown situation occurs for a building, and then perform the specific action of instructing access control system 160 to increase the security level of an entrance point as discussed above. More particularly, security server 102 will not grant access to any room during a lockdown unless the occupants of the room OKs the entry.

Network 120 may be wired or wireless, and comprises a standard network configured to facilitate messaging between any device 121 and server 102. Network 120 includes elements (not shown) such as base stations, base station controllers (BSCs), routers, switches, and the like, arranged, connected, and programmed to provide data service to user equipment 121 (e.g., smart phone or computer 121 operated by user 122) in a manner known to those of skill in the relevant art.

Smart device 121 may be any suitable computing and communication devices configured to engage in wired or wireless communication over network 120. Such communication may comprise standard cellular data. For example, smart device 121 may comprise a mobile device running an Android™ or iOS™ operating system capable of receiving standard text messages from server 102.

In an illustrative embodiment, network 120 is attached (i.e., connected) to server 102 through network interface (410 of FIG. 4) and communicates with server 102. Network 120 is connected via a wired connection to network interfaces 410, although this connection may be wireless in alternative embodiments.

Video surveillance system 140 is configured to detect individuals entering, exiting, or attempting to enter or exit through any access-controlled door. In one embodiment of the present invention, video surveillance system 140 is also configured to determine the identities of individuals within a room. With this in mind, video surveillance system 140 comprises a plurality of video cameras that may be configured to automatically or manually change their field of views over time or track individuals that leave their field of view by moving their field of view. In an alternate embodiment of the present invention, system 140 may be incorporated into a door, as part of an access-control system, and may not have an ability to change a field of view. Video surveillance system 140 is configured with a recognition engine/video analysis engine (VAE) that comprises a software engine that analyzes any video captured by the cameras. Using the VAE, the video surveillance system 140 is capable of "watching" video to detect any individual, determine the individual's identity, and report the detected individual to server 102. In one embodiment of the present invention, video surveillance system 140 comprises an Avigilon™ Control Center (ACC) server having Motorola Solution's Access Control Management (ACM)™ software suite.

Access control system 160 comprises an Internet of Things (IoT) network. IoT network 160 serves to connect doors, cameras (that may include those in system 140), fingerprint sensors, badge scanners, locks, windows, . . . etc., through the IoT. Basically, anything that can be powered can be connected to the internet to control its functionality. System 160 allows objects to be sensed or controlled remotely across existing network infrastructure. For example, access control system 160 may be configured to provide access control to various doors via a proper credential being presented/detected (e.g., ID, key card, NFC credentials, facial recognition, biometrics such as a fingerprint or iris scan, . . . , etc.). Access control system 160 is configured to receive action commands from security server 102 and execute the action received from security server 102. The action commands may take the form of instructions to lock, open or close a door or window, increase a security level for an entrance point as mentioned herein, . . . , etc.

Figure 2:
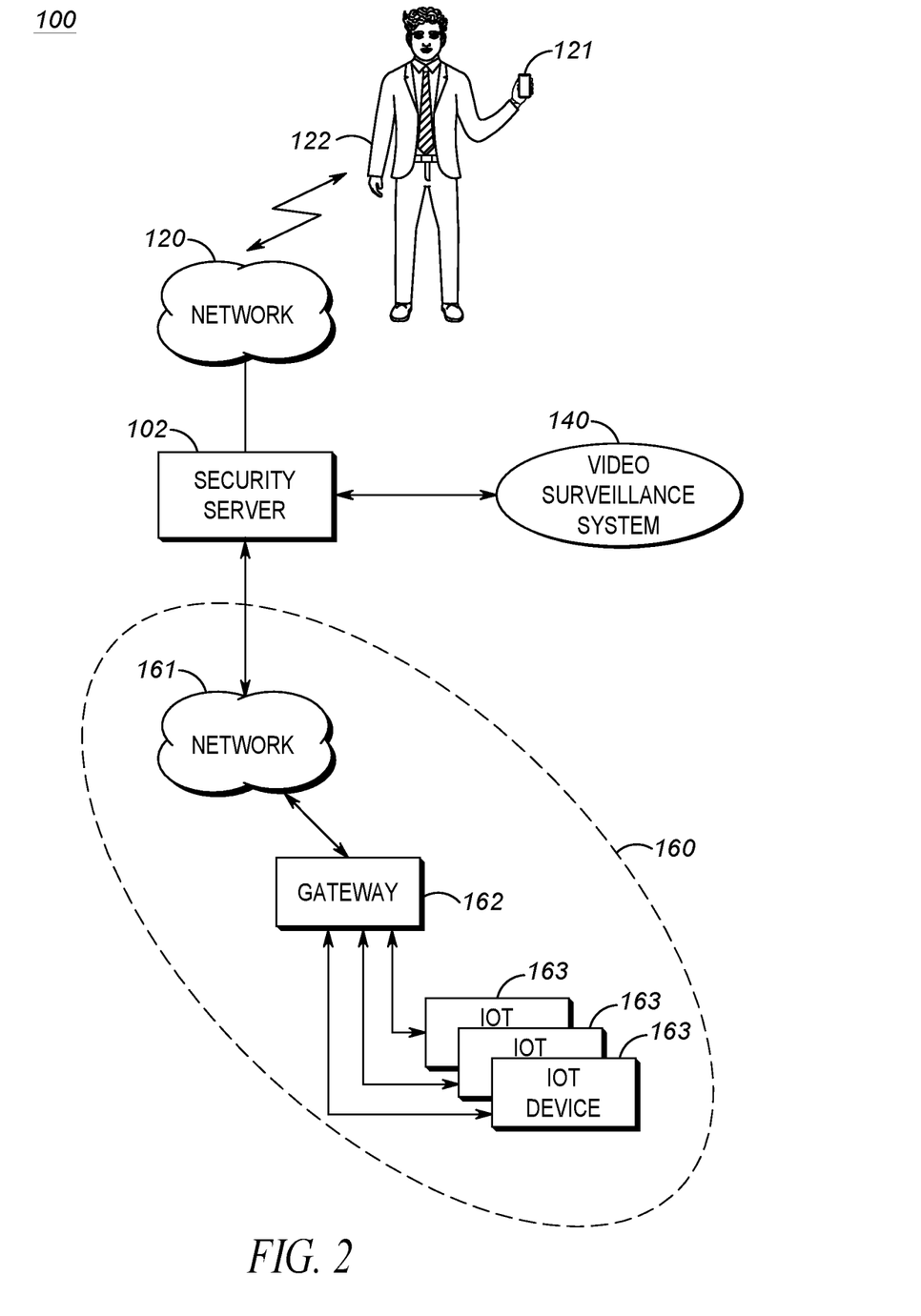
FIG. 2 illustrates a security ecosystem.

FIG. 2 illustrates a security ecosystem capable of determining when a lockdown situation exists and increasing the security level of the entrance point. In particular, FIG. 2 shows security ecosystem 100 with an expanded view of access control system 160. As shown, access control system 160 comprises a plurality of IoT devices 163 coupled to gateway 162. Data passed from security server 102 to IoT devices 163 passes through network 161, gateway 162 and ultimately to IoT device 163. Conversely, data passed from IoT devices 163 to security server 102 passes through gateway 162, network 161, and ultimately to security server 102.

IoT devices 163 preferably comprise devices that control locks, doors, windows, lights, sensors, fingerprint scanners, iris scanners, ID scanners, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTful may also be used.

Gateway 162 preferably comprises an Avigilon™ Control Center running Avigilon's Access Control Management software. Gateway 162 is configured to run the necessary Application Program Interface (API) to provide communications between any IoT device 163 and security server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.12, 802.11g) or a WiMAX protocol perhaps operating in accordance with an IEEE 802.16 standard.

Figure 3:
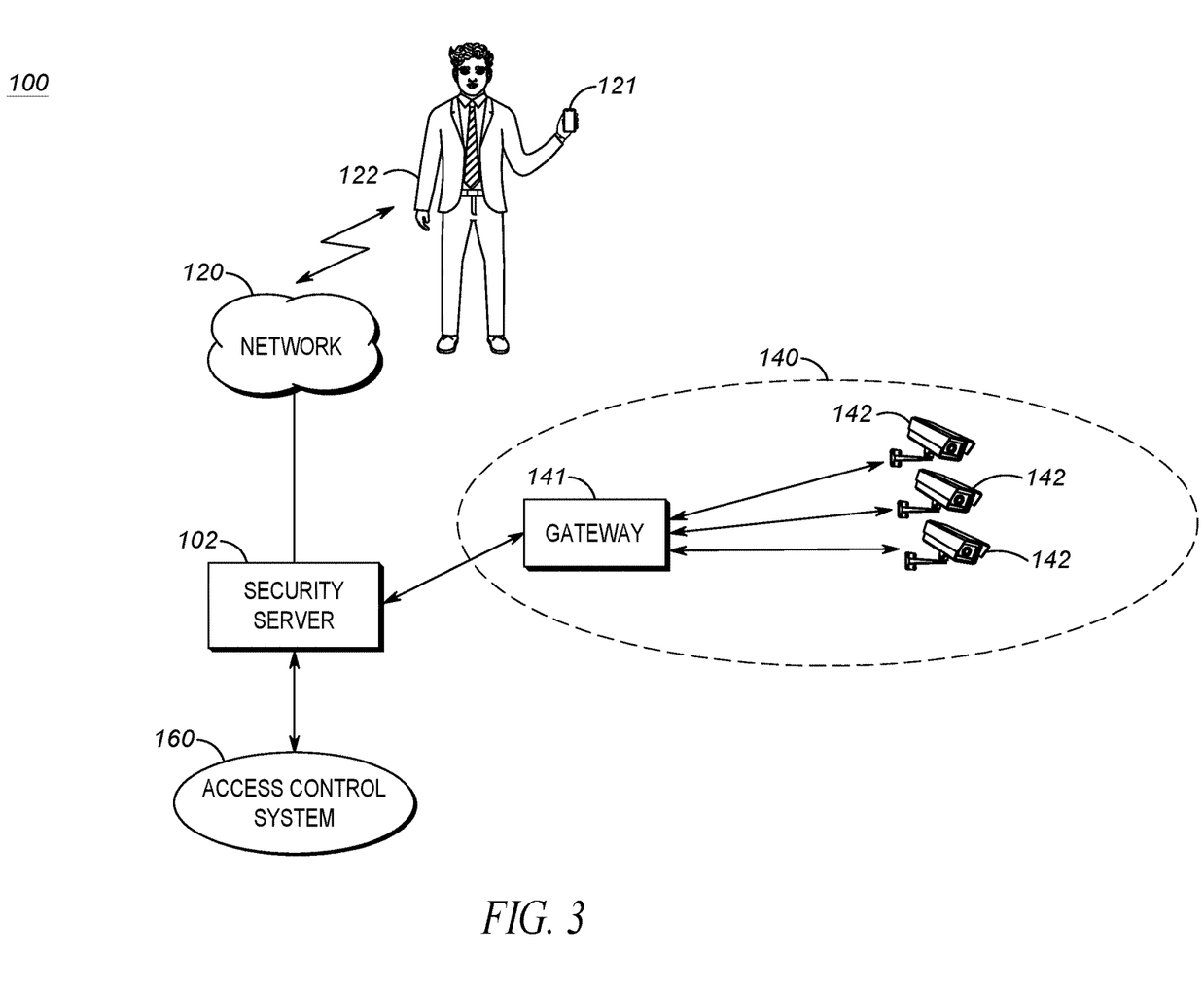
FIG. 3 illustrates a security ecosystem.

FIG. 3 illustrates a security ecosystem capable of determining when a lockdown situation exists and increasing a security level of an access point. In particular, FIG. 3 shows security ecosystem 100 with an expanded view of video surveillance system 140. As shown, video surveillance system 140 comprises a plurality of cameras 142 and gateway 141. In one embodiment of the present invention, cameras 142 are incorporated into a door access control system, and in another embodiment of the present invention, cameras 142 are stand-alone cameras part of a CCTV system.

Cameras 142 may be fixed or mobile, and may have pan/tilt/zoom (PTZ) capabilities to change their field of view, and may be configured to track objects that move from their field of view by panning, tilting, and/or zooming. Cameras 142 may also comprise circuitry configured to serve as a video analysis engine (VAE) which comprises a software engine that analyzes analog and/or digital video. The engine may be configured to "watch" video and detect pre-selected objects or fields of view such as people, faces, a door entrance, . . . , etc. The software engine may also be configured to detect certain actions of individuals, such as determine the identities of individuals entering and leaving a room through an access point. This information is provided to security server so that security server can determine who (if anyone) is currently in any particular room being "watched" by any camera 142.

Gateway 141 preferably comprises an Avigilon™ Control Center running Avigilon's Access Control Management software. Gateway 141 is configured to run the necessary Application Program Interface (API) to provide communications between any cameras 142 and security server 102.

It should be noted that an entrance to a room may comprise multiple cameras surveying both inside and outside the room. Each camera may be assigned a different function and potentially a different VAE. For example, a small camera at a door may provide facial recognition services prior to granting entry, while another camera at the entrance may provide general wide-area surveillance of the entrance. While yet another camera within a room may provide information and identifications of the occupants of the room. The occupants of the room may also be determined by a single camera monitoring who enters and exits the room.

Figure 4:
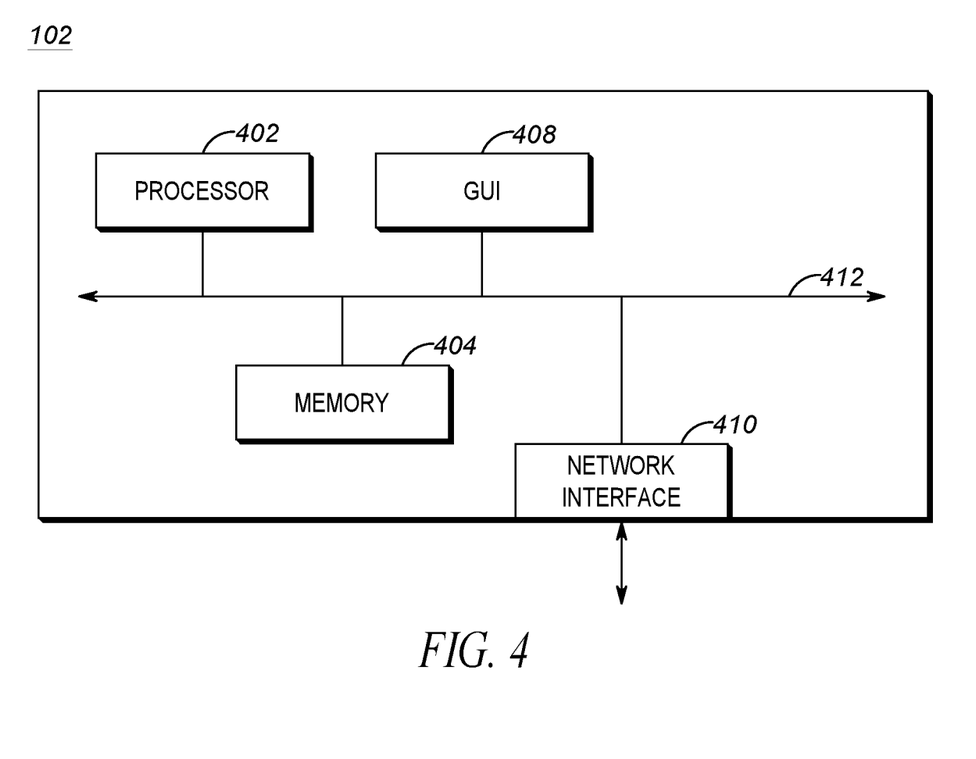
FIG. 4 is a block diagram of a security server.

FIG. 4 is a block diagram of security server 102 of FIG. 1. Server 102 is capable of executing instructions (sequential or otherwise) that specify actions to be taken by the server. Server 102 may include various components connected by bus 412. Server 102 may include hardware processor (logic circuitry) 402 such as one or more central processing units (CPUs) or other processing circuitry able to provide any of the functionality described herein when running instructions. Processor 402 may be connected to memory 404 that may include a non-transitory machine-readable medium on which is stored one or more sets of instructions. Memory 404 may include one or more of static or dynamic storage, or removable or non-removable storage, for example. A machine-readable medium may include any medium that is capable of storing, encoding, or carrying instructions for execution by processor 402, such as solid-state memories, magnetic media, and optical media. Machine-readable medium may include, for example, Electrically Programmable Read-Only Memory (EPROM), Random Access Memory (RAM), or flash memory.

The instructions may enable server 102 to operate in any manner thus programmed, such as the functionality described specifically herein, when processor 402 executes the instructions. The machine-readable medium may be stored as a single medium or in multiple media, in a centralized or distributed manner. In some embodiments, instructions may further be transmitted or received over a communications network via a network interface 410 utilizing any one of a number of transfer protocols (e.g., frame relay, internet protocol (IP), transmission control protocol (TCP), user datagram protocol (UDP), hypertext transfer protocol (HTTP), etc.).

Network interface 410 may thus enable server 102 to communicate with devices 112, IoT devices 163, and cameras 142. Network interface 410 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which camera may be connected via network interface 410 may include a local area network (LAN), a wide area network (WAN), a packet data network (e.g., the Internet), mobile telephone networks (e.g., cellular networks), and wireless data networks.

GUI 408 provides a man/machine interface for receiving an input from a user and displaying information. For example, GUI 408 may provide a way for a user to trigger a lockdown situation and provide this information to processor 403. In order to provide the above features (and additional features), GUI 408 may comprise any combination of a touch screen, a computer screen, a keyboard, or any other interface needed to receive a user input and provide information to the user.

During operation, processor 402 is continuously determining what individuals are currently within various rooms of a premise. In one embodiment, is accomplished by receiving this information from video surveillance system 140, and storing identities of the current occupants of the premise along with what rooms they currently reside in. For example, processor 402 may receive information from surveillance system 140 that Jim Smith has just left room 104 or that Mary Jones has just entered room 414. From this information, processor 402 will be able to determine occupants of each room within the premise. This information is stored in processor 402.

When processor 402 receives a lockdown notification from a user of GUI 408, processor 402 will increase security measures for accessing rooms on premise. More particularly, if any person attempts to use an access control to enter a room (e.g., a badge scanner 163), logic circuitry 402 will be informed of the attempted entry and provided an identity of the person attempting to enter by access control system 160. Logic circuitry 402 will then determine who is currently residing in the room. The persons residing in the room will be messaged via network 120 to request permission to grant access to the person attempting to gain access. In one embodiment the name of the individual is provided. In another embodiment, persons in the room are simply notified that someone wants access. In alternate embodiments of the present invention, other information may be provided, such as, the occupation of the person attempting to gain entry (e.g., a security guard, maintenance, . . . , etc.).

Logic circuitry 402 will then wait for any response from any person within the room. If a positive response is received, the door will be unlocked and the person allowed to enter the room, otherwise, the door will remain locked.

Figure 5:
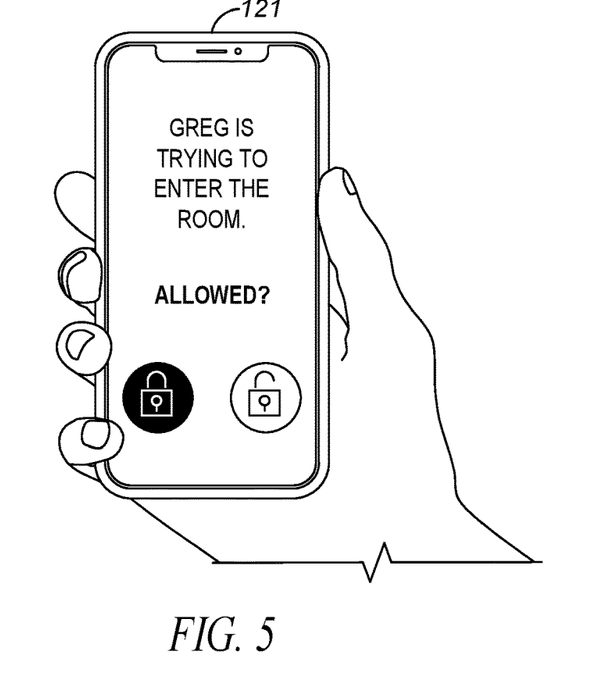
FIG. 5 illustrates a device controlling whether access to a room is given.
Figure 6:
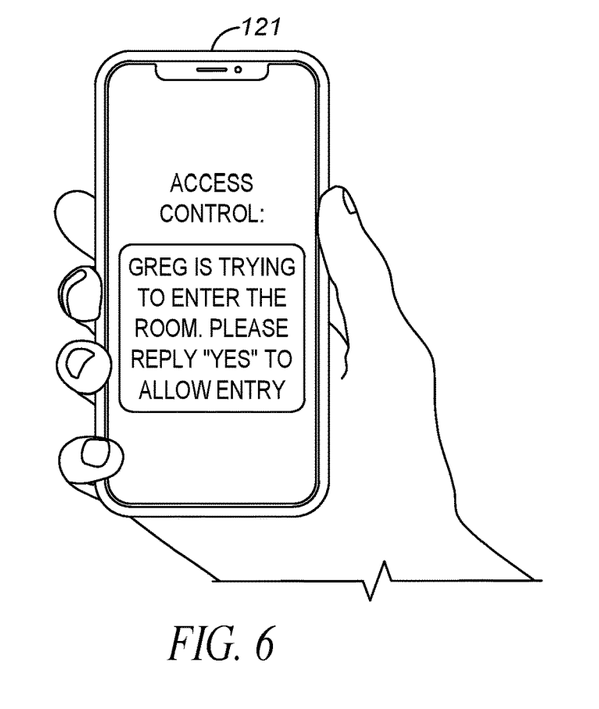
FIG. 6 illustrates a device controlling whether access to a room is given.

In one embodiment of the present invention, devices 112 will run a specialized application that presents the occupant(s) of the room with a message and two buttons. A first button OKs access, and a second button denies access. This is shown in FIG. 5 In a second embodiment of the present invention, everyone currently within the room will receive a text message, and will have to reply in the affirmative (e.g., "yes") in order for the access control system to allow entry. This is shown in FIG. 6.

Thus, as described, server 102 comprises an apparatus comprising a network interface and logic circuitry. The logic circuitry is configured to receive a notification that a lockdown situation is in effect, receive, from the network interface, an access request from a person, the access request requesting permission to enter a room, determine occupants of the room, message the occupants of the room to request permission to grant access to the person, and not grant the access request unless a response received from at least one of the occupants of the room that it is OK to grant the access request.

As discussed above, a GUI can be provided, wherein the logic circuitry is also configured to receive the notification that the lockdown situation is in effect by receiving the notification from the GUI.

As discussed above, memory can be provided, wherein the logic circuitry determines occupants of the room from the memory. With this in mind, the logic circuitry can be further configured to receive via the network interface, occupants of the room from a surveillance system and store the occupants of the room in the memory.

As discussed above, the access request may comprise a keycard access request from an IoT device controlling access to a door, wherein the door provides access to the room. The access request may also comprise an ID, a key card, an NFC credential, a face, a fingerprint, an iris presenting to an IoT device controlling access to a door, wherein the door provides access to the room.

The logic circuitry is further configured to receive a response from an occupant of the room, wherein the response gives permission to grant access, and causes the door to be unlocked based on the response giving permission to grant access. This response may comprise a text message or a response from an interface presented on a device seeking the response.

Server 102 may comprise a network interface and logic circuitry configured to receive a notification that a lockdown situation is in effect, receive, from the network interface, an access request from an IoT device, the access request requesting permission to unlock a door that provides entry into a room determine occupants of the room, message at least one occupant of the room to request permission to unlock the door, and not unlock the door unless a response is received from the occupants of the room that it is OK to unlock the door.

Figure 7:
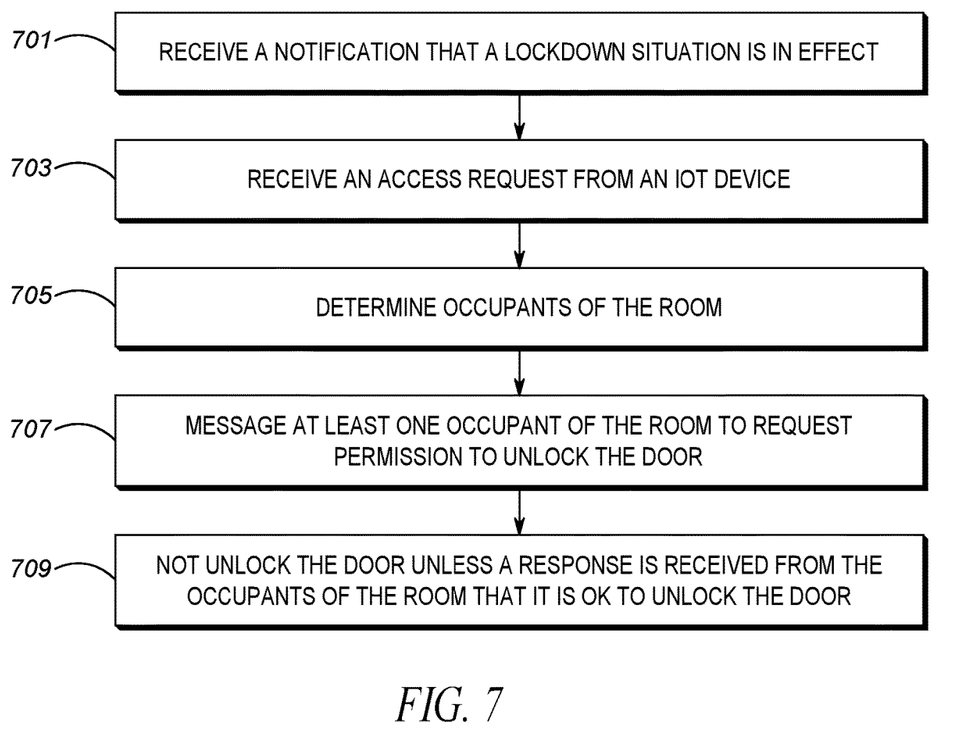
FIG. 7 is a flow chart showing operation of the security server of FIG. 4.

FIG. 7 is a flow chart showing operation of server 102. The logic flow begins at step 701 where processor 402 receives a notification that a lockdown situation is in effect. At step 703, processor 402 receives an access request from an IoT device, the access request requesting permission to unlock a door that provides entry into a room. Processor 402 then determines occupants of the room (step 705) and messages at least one occupant of the room to request permission to unlock the door (step 707). Finally, at step 709 processor 402 fails to unlock the door unless a response is received from the occupants of the room that it is OK to unlock the door. Step 709 entails logic circuitry 402 determining if a response OKing access has been received, and either unlocking the door if so, otherwise keeping the door locked.

In the foregoing specification, specific embodiments have been described. However, one of the ordinary skills in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a network interface; and
logic circuitry configured to:
receive a notification that a lockdown situation is in effect;
receive, from the network interface, an access request from an IoT device controlling access to a door, wherein the door provides access to a room, wherein the access request comprises an ID, a key card, an NFC credential, a fingerprint, or an iris being presented to the IoT device controlling access to a door;
determine occupants of the room from a memory or from a surveillance system;
message the occupants of the room to request permission to grant access to the person;
receive from at least one of the occupants of the room a response that it is OK to grant the access request; and
send a message to the IoT device to unlock the door based on the response.

2. The apparatus of claim 1 further comprising:
a graphical-user interface (GUI); and
wherein the logic circuitry is configured to receive the notification that the lockdown situation is in effect by receiving the notification from the GUI.

3. The apparatus of claim 1 wherein the logic circuitry is further configured to:
receive via the network interface, occupants of the room from the surveillance system; and
store the occupants of the room in the memory.

4. The apparatus of claim 1 wherein the logic circuitry is further configured to:
receive the response from an occupant of the room, wherein the response gives permission to grant access; and
cause a door to be unlocked based on the response giving permission to grant access.

5. The apparatus of claim 1 wherein the response comprises a text message.

6. The apparatus of claim 1 wherein the response comprises an interface presented on a device seeking the response.

7. An apparatus comprising:
a network interface; and
logic circuitry configured to:
receive a notification that a lockdown situation is in effect;
receive, from the network interface, an access request from an IoT device controlling access to a door, the access request requesting permission for the IoT device to unlock the door that provides entry into a room, wherein the access request comprises an ID, a key card, an NFC credential, a fingerprint, or an iris being presented to the IoT device controlling access to the door;
determine occupants of the room from electronic memory or from a surveillance system;
message at least one occupant of the room to request permission to unlock the door;
receive a response from at least one of the occupants of the room that it is OK to unlock the door; and
send a message to the IoT device to unlock the door based on the response.

8. The apparatus of claim 7 further comprising:
a graphical-user interface (GUI); and
wherein the logic circuitry is configured to receive the notification that the lockdown situation is in effect by receiving the notification from the GUI.

9. The apparatus of claim 8 wherein the logic circuitry is further configured to:
receive via the network interface, occupants of the room from the surveillance system; and
store the occupants of the room in the memory.

* * * * *